C. Rowland's
Head-Rest.

No 75,982. Patented Mar. 24. 1868.

Witnesses.
P. T. Dodge
Jno. Johnson

Inventor.
Charles Rowland
by Dodge & Munn
his atty

United States Patent Office.

CHARLES ROWLAND, OF WASHINGTON, DISTRICT OF COLUMBIA.

Letters Patent No. 75,982, dated March 24, 1868.

IMPROVED CAR-SEAT.

*The Schedule referred to in these Letters Patent and making part of the same.*

TO ALL WHOM IT MAY CONCERN:

Be it known that I, CHARLES ROWLAND, of Washington, in the county of Washington, and District of Columbia, have invented certain new and useful Improvements in Car-Seats; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in providing the backs of car-seats with a head-rest, so arranged that, when not in use, it can be slid down within the back of the seat, out of the way, and, when required, may be drawn up for use, as hereinafter explained.

Figure 1:
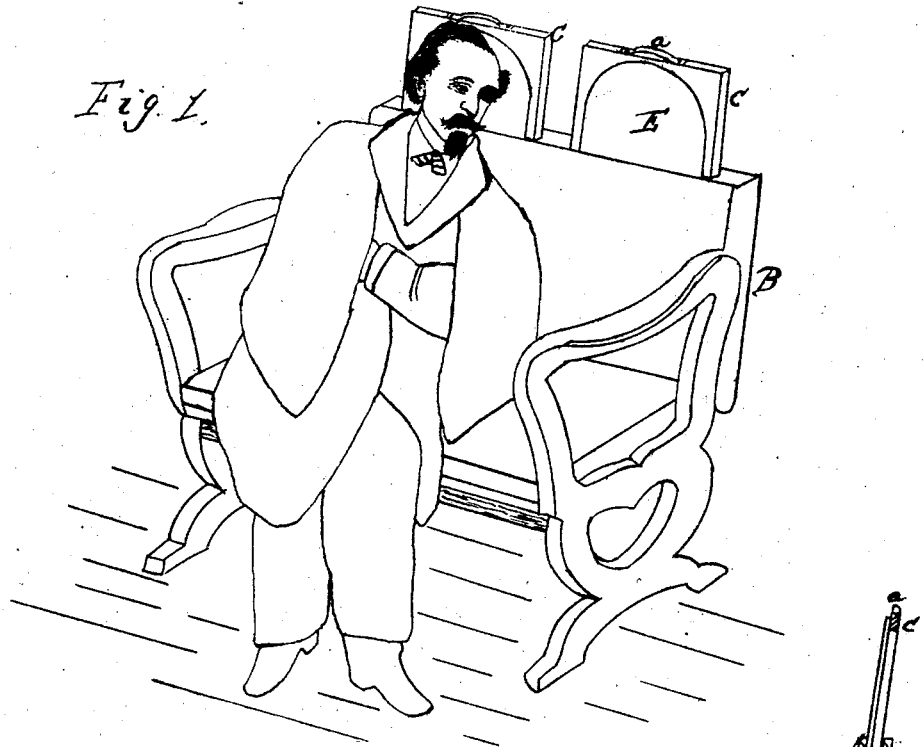
Figure 1 is a perspective view.

As a large amount of railway-travel occurs at night, it is desirable to so arrange the seats as to enable the occupants to occupy, and, if need be, to sleep in them with comfort. With the seats as ordinarily made, this is impossible, for the reason that there is no support for the head. To remedy this objection, and provide a comfortable rest for the head, I construct the back of the seat B hollow, and insert therein a frame, C, the central portion of which has stretched across it a sheet, E, of rubber, or other flexible material, against which the head may rest in ease, as represented in fig. 1. This frame C is of a length equal to the width of the back, B, of the seat, and is arranged to be drawn out at either edge of the back, so that it can be used with equal facility whichever side up the back may be turned.

Figure 2:
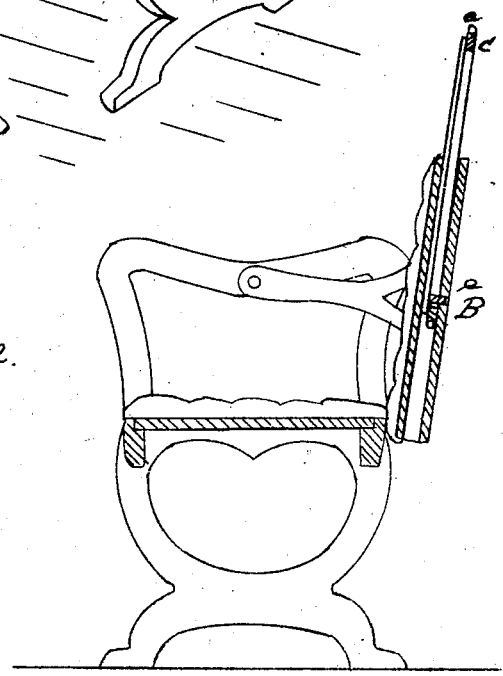
Figure 2 is a vertical section of the same, taken on the line $x\ x$ of fig. 1.

To prevent the frame from being pulled entirely out, by accident or otherwise, a pin, $e$, is inserted, as shown in fig. 2, so as to act as a stop, by hitting against the end-bar of the frame whenever it is drawn out far enough on either side. And, if desired, the pin $e$ may be inserted between two coiled springs placed vertically in a groove in the back, so as to be movable, and thus allow the frame to be drawn out much more than half way, at will. In this case I also provide a catch at the side of the frame to hold it in place when so drawn out. Instead of the pin $e$, a spring-catch may be used, and so arranged as to permit the frame C to be drawn out to any required distance, and held there while in use, the catch or spring being attached to the back, and engaging in suitable notches in the side or edge of the frame; or it may be attached to the frame, and arranged to engage in suitable notches in the back; there being many ways in which this may be effected. Instead of a sheet of rubber, canvas, or other flexible material, may be used, in which case, in order to render it sufficiently yielding to prevent jar, and make it easy for the head, the canvas, leather, or whatever may be used for covering the frame C, may be secured to the frame, around its edge, by elastic webbing, or it may be secured by springs, embedded in or attached to the frame G.

It is also obvious that cushions may be used instead of the rubber sheet E on the frames, but this is objectionable for the reason, that in order to render them sufficiently soft and yielding, they would require to be made so thick that they could not be inserted within the back without rendering the latter too clumsy or bulky.

It is further obvious that the frames or rests C may be arranged to slide on the outside of the back, B, instead of within it, and accomplish the same object. But this plan is not considered as good, for the reason that the frames or rests would be exposed to injury, and would interfere with the proper or desirable finish of the backs on their rear side.

By this improvement I provide a head-rest that will enable the traveller to rest in ease, and, if he desires, to sleep in his seat with comfort, and which is always at his command, ready for use, day or night, whenever desired, and which can, at any time, be shoved out of the way, and where it will be protected from injury.

By the use of this improvement sleeping-cars, now so clumsy, expensive, and objectionable, may be entirely dispensed with, and, at the same time, all the passengers on a train be provided with the means of riding and sleeping in comfort, and this may be done at a trifling expense, and without the addition of any weight of consequence.

Having thus described my invention, what I claim, is—

The head-rest, consisting of the frame C, provided with the sheet of rubber, or other flexible material, and arranged to slide within the back of the seat, and be protruded from either side thereof. substantially as shown and described.

CHS. ROWLAND.

Witnesses:
  H. B. MUNN,
  P. T. DODGE.